(12) United States Patent
Hakola et al.

(10) Patent No.: US 9,215,640 B2
(45) Date of Patent: Dec. 15, 2015

(54) APPARATUS AND METHOD FOR USE IN A COMMUNICATION NETWORK

(71) Applicant: Broadcom Corporation, Irvine, CA (US)

(72) Inventors: Sami Jukka Hakola, Kempele (FI); Samuli Turtinen, Li (FI); Timo K. Koskela, Oulu (FI); Seppo Alanara, Oulu (FI)

(73) Assignee: BROADCOM CORPORATION, Irvine, CA (US)

( * ) Notice: Subject to any disclaimer, the term of this patent is extended or adjusted under 35 U.S.C. 154(b) by 0 days.

(21) Appl. No.: 14/051,481

(22) Filed: Oct. 11, 2013

(65) Prior Publication Data

US 2014/0106757 A1  Apr. 17, 2014

(30) Foreign Application Priority Data

Oct. 12, 2012  (GB) .................................. 1218373.7

(51) Int. Cl.

| | |
|---|---|
| *H04W 24/00* | (2009.01) |
| *H04W 36/00* | (2009.01) |
| *H04M 3/00* | (2006.01) |
| *H04B 7/00* | (2006.01) |
| *H04W 36/32* | (2009.01) |
| *H04W 76/04* | (2009.01) |

(52) U.S. Cl.
CPC ............ *H04W 36/32* (2013.01); *H04W 76/043* (2013.01); *H04W 36/0055* (2013.01)

(58) Field of Classification Search
CPC ....... H04W 4/023; H04W 8/005; H04W 4/02; H04W 76/02; H04W 40/246; H04W 84/18; H04W 28/06; H04W 4/025; H04W 4/028; H04W 4/06; H04W 64/00; H04W 88/04; H04W 88/08; H04W 8/18; H04W 16/14
USPC ........ 455/41.2, 456.1, 3.01, 456.3, 11.1, 124, 455/418, 426.1, 440, 500, 507, 509; 370/236, 252, 329, 330, 328
See application file for complete search history.

(56) References Cited

U.S. PATENT DOCUMENTS

| | | | | |
|---|---|---|---|---|
| 2002/0187779 | A1* | 12/2002 | Freeny, Jr. ..................... | 455/422 |
| 2007/0155401 | A1* | 7/2007 | Ward et al. ................. | 455/456.1 |
| 2008/0299974 | A1* | 12/2008 | Lee et al. ...................... | 455/436 |
| 2011/0182252 | A1* | 7/2011 | Liu et al. ....................... | 370/329 |
| 2013/0287012 | A1* | 10/2013 | Pragada et al. ............... | 370/338 |
| 2014/0066058 | A1* | 3/2014 | Yu et al. ........................ | 455/434 |
| 2014/0335791 | A1* | 11/2014 | Kim et al. .................... | 455/41.2 |
| 2014/0335906 | A1* | 11/2014 | Kim et al. ..................... | 455/509 |

FOREIGN PATENT DOCUMENTS

| | | | | |
|---|---|---|---|---|
| GB | 2472792 A | | 2/2011 | |
| WO | 99/33307 | | 7/1999 | |
| WO | WO99/33307 | * | 7/1999 | .............. H04Q 7/38 |
| WO | 2011/109027 | | 9/2011 | |

* cited by examiner

*Primary Examiner* — Inder Mehra
(74) *Attorney, Agent, or Firm* — Oblon, McClelland, Maier & Neustadt, L.L.P.

(57) ABSTRACT

There is provided a method, comprising: acquiring, by a user terminal capable of performing proximity services with at least one other user terminal, an indication that a handover from a source cell to a target cell is to be performed; and acquiring a capability indication on whether or not a target node of the target cell is capable to support the proximity services.

23 Claims, 5 Drawing Sheets

---

400 DETECTING THAT THERE IS AT LEAST ONE USER TERMINAL WITHIN THE SOURCE CELL TO BE HANDED OVER TO A TARGET CELL, WHEREIN THE AT LEAST ONE USER TERMINAL IS CAPABLE OF PERFORMING PROXIMITY SERVICES WITH ANOTHER USER TERMINAL

↓

402 ACQUIRING CAPABILITY INFORMATION ON WHETHER OR NOT A TARGET NODE OF THE TARGET CELL IS CAPABLE TO SUPPORT THE PROXIMITY SERVICES BETWEEN AT LEAST TWO USER TERMINALS LOCATED WITHIN THE TARGET CELL

↓

404 CAUSING A CAPABILITY INDICATION ON WHETHER OR NOT THE TARGET NODE IS CAPABLE TO SUPPORT THE PROXIMITY SERVICES TO THE AT LEAST USER TERMINAL DURING THE HANDOVER

```
┌─────────────────────────────────────────────────────────────────┐
│ 300 ACQUIRING AN INDICATION THAT A HANDOVER FROM A SOURCE CELL TO│
│              A TARGET CELL IS TO BE PERFORMED                    │
└─────────────────────────────────────────────────────────────────┘
                                 ↓
┌─────────────────────────────────────────────────────────────────┐
│ 302 ACQUIRING A CAPABILITY INDICATION ON WHETHER OR NOT A TARGET NODE │
│   OF THE TARGET CELL IS CAPABLE TO SUPPORT THE PROXIMITY SERVICES│
└─────────────────────────────────────────────────────────────────┘
```

FIG. 3

```
┌─────────────────────────────────────────────────────────────────┐
│ 400 DETECTING THAT THERE IS AT LEAST ONE USER TERMINAL WITHIN THE SOURCE CELL│
│  TO BE HANDED OVER TO A TARGET CELL, WHEREIN THE AT LEAST ONE USER TERMINAL │
│     IS CAPABLE OF PERFORMING PROXIMITY SERVICES WITH ANOTHER USER TERMINAL  │
└─────────────────────────────────────────────────────────────────┘
                                 ↓
┌─────────────────────────────────────────────────────────────────┐
│ 402 ACQUIRING CAPABILITY INFORMATION ON WHETHER OR NOT A TARGET NODE│
│ OF THE TARGET CELL IS CAPABLE TO SUPPORT THE PROXIMITY SERVICES BETWEEN│
│        AT LEAST TWO USER TERMINALS LOCATED WITHIN THE TARGET CELL│
└─────────────────────────────────────────────────────────────────┘
                                 ↓
┌─────────────────────────────────────────────────────────────────┐
│ 404 CAUSING A CAPABILITY INDICATION ON WHETHER OR NOT THE TARGET NODE│
│   IS CAPABLE TO SUPPORT THE PROXIMITY SERVICES TO THE AT LEAST USER│
│                       TERMINAL DURING THE HANDOVER               │
└─────────────────────────────────────────────────────────────────┘
```

FIG. 4

```
┌─────────────────────────────────────────────────────────────────┐
│ 500 DETERMINING WHETHER OR NOT THE TARGET NODE IS CAPABLE TO SUPPORT PROXIMITY│
│   SERVICES BETWEEN AT LEAST TWO USER TERMINALS LOCATED WITHIN THE TARGET CELL│
└─────────────────────────────────────────────────────────────────┘
                                 ↓
┌─────────────────────────────────────────────────────────────────┐
│ 502 INDICATING THE DETERMINATION RESULT TO AT LEAST ONE OF THE FOLLOWING:│
│ TO A SOURCE NODE OF A SOURCE CELL FOR DISTRIBUTION TO THE AT LEAST ONE USER TERMINAL│
│    WHICH IS TO BE HANDED OVER TO THE TARGET CELL DURING THE HANDOVER, │
│      DIRECTLY TO THE AT LEAST ONE USER TERMINAL AFTER THE HANDOVER│
└─────────────────────────────────────────────────────────────────┘
```

FIG. 5

APPARATUS AND METHOD FOR USE IN A COMMUNICATION NETWORK

CROSS-REFERENCE TO RELATED APPLICATIONS

This application claims the benefit under 35 U.S.C. §119 (a) and 37 CFR §1.55 to UK patent application no. GB1218373.7, filed on 12 Oct. 2012, the entire content of which is incorporated herein by reference.

BACKGROUND OF THE INVENTION

1. Field of the Invention

The invention relates to apparatus and methods for use in communication networks and generally in mobile communication networks. At least some embodiments of the invention relate to facilitating proximity services upon handover of a user terminal.

2. Description of the Related Technology

Proximity Services (ProSe) may be one of the candidate building blocks in the future long term evolution (LTE) releases. The ProSe comprises, for example, a user terminal (UE) discovery process, i.e. discovery of another UE within proximity, based on direct radio signals between the UEs or network side proximity detection. However, in case of handover from a source cell, the UE may face different radio environments in a target cell.

SUMMARY

In a first exemplary embodiment of the invention there is a method, comprising: acquiring, by a user terminal capable of performing proximity services with at least one other user terminal, an indication that a handover from a source cell to a target cell is to be performed; and acquiring a capability indication on whether or not a target node of the target cell is capable of supporting the proximity services.

In a second exemplary embodiment of the invention there is a method, comprising: detecting, by a network node of a source cell with respect to a handover, that there is at least one user terminal within the source cell to be handed over to a target cell, wherein the at least one user terminal is capable of performing proximity services with another user terminal; acquiring capability information on whether or not a target node of the target cell is capable of supporting the proximity services between at least two user terminals located within the target cell; and causing a capability indication on whether or not the target node is capable of supporting the proximity services to the at least one user terminal during the handover.

In a third exemplary embodiment of the invention there is a method, comprising: determining, by a network node of a target cell with respect to a handover, whether or not it is capable of supporting proximity services between at least two user terminals located within the target cell; and causing an indication of the determination result to at least one of the following: to a source node of a source cell for distribution to the at least one user terminal which is to be handed over to the target cell during the handover, directly to the at least one user terminal after the handover.

In a fourth exemplary embodiment of the invention there is an apparatus, comprising: at least one processor and at least one memory including computer program code, the at least one memory and the computer program code configured to, with the at least one processor, cause the apparatus at least to: cause a user terminal capable of performing proximity services with at least one other user terminal to acquire an indication that a handover from a source cell to a target cell is to be performed; and acquire a capability indication on whether or not a target node of the target cell is capable of supporting the proximity services.

In a fifth exemplary embodiment of the invention there is an apparatus, comprising: at least one processor and at least one memory including computer program code, the at least one memory and the computer program code configured to, with the at least one processor, cause the apparatus at least to: detect that there is at least one user terminal within a source cell to be handed over to a target cell, wherein the at least one user terminal is capable of performing proximity services with another user terminal; acquire capability information on whether or not a target node of the target cell is capable of supporting the proximity services between at least two user terminals located within the target cell; and cause a capability indication on whether or not the target node is capable of supporting the proximity services to the at least user terminal during the handover.

In a sixth exemplary embodiment of the invention there is an apparatus, comprising: at least one processor and at least one memory including computer program code, the at least one memory and the computer program code configured to, with the at least one processor, cause the apparatus at least to: determine whether or not a network node of a target cell with respect to a handover is capable of supporting proximity services between at least two user terminals located within the target cell; and cause an indication of the determination result to at least one of the following: to a source node of a source cell for distribution to the at least one user terminal which is to be handed over to the target cell during the handover, directly to the at least one user terminal after the handover.

In a seventh exemplary embodiment of the invention there is a non-transitory computer readable medium comprising a set of computer readable instructions stored thereon, which, when executed by a processing system, cause the processing system to carry out a method, comprising: acquiring, by a user terminal capable of performing proximity services with at least one other user terminal, an indication that a handover from a source cell to a target cell is to be performed; and acquiring a capability indication on whether or not a target node of the target cell is capable of supporting the proximity services.

In an eighth exemplary embodiment of the invention there is a non-transitory computer readable medium comprising a set of computer readable instructions stored thereon, which, when executed by a processing system, cause the processing system to carry out a method, comprising: detecting, by a network node of a source cell with respect to a handover, that there is at least one user terminal within the source cell to be handed over to a target cell, wherein the at least one user terminal is capable of performing proximity services with another user terminal; acquiring capability information on whether or not a target node of the target cell is capable of supporting the proximity services between at least two user terminals located within the target cell; and causing a capability indication on whether or not the target node is capable of supporting the proximity services to the at least one user terminal during the handover.

In a ninth exemplary embodiment of the invention there is a non-transitory computer readable medium comprising a set of computer readable instructions stored thereon, which, when executed by a processing system, cause the processing system to carry out a method, comprising: comprising: determining, by a network node of a target cell with respect to a handover, whether or not it is capable of supporting proximity services between at least two user terminals located within the target cell; and causing an indication of the determination result to at least one of the following: to a source node of a source cell for distribution to the at least one user terminal which is to be handed over to the target cell during the handover, directly to the at least one user terminal after the handover.

In a tenth exemplary embodiment of the invention there is an apparatus comprising processing means configured to cause the apparatus to perform any of the embodiments as described in the appended claims.

In an eleventh exemplary embodiment of the invention there is an apparatus comprising a processing system configured to cause the apparatus to perform any of the embodiments as described in the appended claims.

In a twelfth exemplary embodiment of the invention there is an apparatus comprising means for performing any of the embodiments as described in the appended claims.

Embodiments of the invention are defined in the dependent claims.

BRIEF DESCRIPTION OF THE DRAWINGS

In the following, the invention will be described in greater detail with reference to the embodiments and the accompanying drawings, in which

FIGS. 3 to 5 show methods, according to some embodiments;

DETAILED DESCRIPTION OF CERTAIN INVENTIVE EMBODIMENTS

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Figure 1:
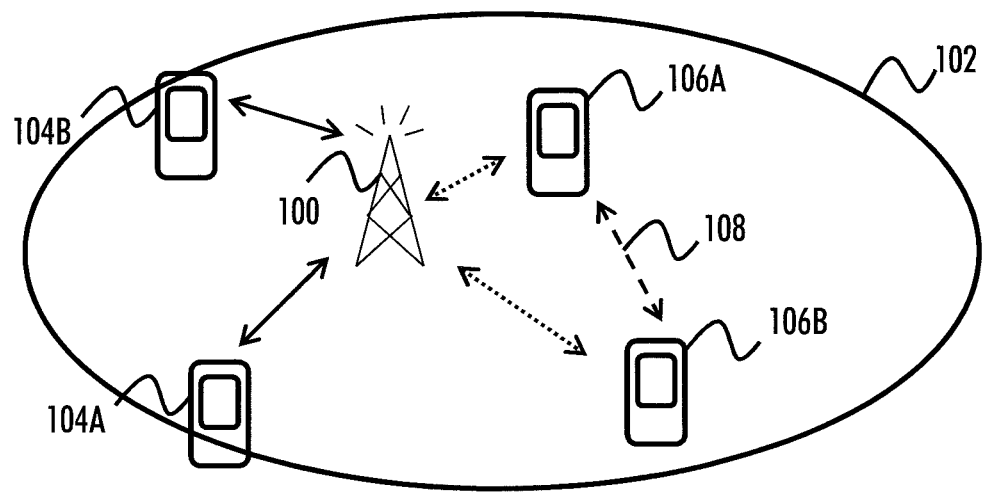
FIGS. 1 and 2 present communication networks, according to some embodiments.

Referring to FIG. 1, radio communication networks, such as the Long Term Evolution (LTE) or the LTE-Advanced (LTE-A) of the 3$^{rd}$ Generation Partnership Project (3GPP), are typically composed of at least one base station 100 (also called a base transceiver station, a radio network controller, a Node B, or an evolved Node B, for example) providing coverage to a cell 102, at least one user equipment (UE) 104A, 104B, 106A, 106B (also called a user terminal, terminal device or a mobile station, for example) and optional network elements that provide the interconnection towards the core network. The base station 100 may be a node B (NB) as in the LTE, an evolved node B (eNB) as in the LTE-A, a radio network controller (RNC) as in the UMTS, a base station controller (BSC) as in the GSM/GERAN, or any other apparatus capable of controlling radio communication and managing radio resources within the cell 102. The base station may connect the UEs 104A, 104B via the so-called radio interface to the network. In general, a base station may be configured to provide communication services for the UEs according to at least one of the following radio access technologies (RATs): Worldwide Interoperability for Microwave Access (WiMAX), Global System for Mobile communications (GSM, 2G), GSM EDGE radio access Network (GE-RAN), General Packet Radio Service (GRPS), Universal Mobile Telecommunication System (UMTS, 3G) based on basic wideband-code division multiple access (W-CDMA), high-speed packet access (HSPA), LTE, and/or LTE-A. The present embodiments are not, however, limited to these protocols.

Still referring to FIG. 1, in addition to or instead of conventional communication links to the UEs 104A, 104B, direct device-to-device (D2D) connections may be established among terminal devices, such as between terminal devices 106A and 106B. The D2D may also be referred to as mobile-to-mobile (M2M), terminal-to-terminal (T2T), peer-to-peer (P2P). The D2D communication may be integrated into the cellular network, such as the LTE/LTE-A cellular network. The integration may denote that devices 106A and 106B having a direct physical communication link 108 utilize the radio resources of the cellular network, thus sharing the cellular network resources of the licensed band with other devices 104A, 104B having the conventional cellular communication to the eNB 100.

Terminal devices that have established a radio resource control (RRC) connection with the eNB 100 may have their D2D communication links 108 controlled by the eNB 100 as shown with dotted arrows in FIG. 1. Thus, the eNB 100 may be responsible for allocating radio resources to the direct communication link 108 as well as for the conventional communication links. Before such direct D2D communication may take place, the user terminals 106A, 106B may need to be aware of the presence of other user terminals capable of such D2D communication. In order to enable this, a D2D discovery process may be applied. In the discovery process, the user terminal 106A or 106B may, for example, inform other user terminals in the proximity about its capability to perform the D2D communication directly with another UE. To be able to send a UE discovery messages in a synchronous manner, it may be that the UE 106A, 106B need to be in an RRC connected state while being active in the ProSe UE discovery.

The ProSe may be used to enhance the radio communication network. The proximity services may comprise, for example, transfer of advertisements or communication between two closely located UEs 106A, 106B, etc. As one possible option, the ProSe may comprise communication via a local switch (e.g. a home eNB, a macro eNB), instead of via the core network. As a consequence, by using the proximity service, the optimized communication path may be found to exist directly between the two UEs 106A, 106B instead of the typical manner via the eNB 100, for example. In the beginning, the UE registers to a ProSe service. After a successful registration, the UE may have an active ProSe context with certain capabilities. For instance the ProSe UE may be able to involve in the UE discovery process but may not (yet) have support for the direct ProSe communication with another UE.

In the LTE some cells may support the ProSe while some other cells may not. Supporting the ProSe may denote from the eNB's point of view that the eNB is able to provide the UEs 106A, 106B with radio resources for the D2D communication, for the UE discovery process, or that the eNB is able to act as a local switch, etc. It should be noted that although the ProSe may denote functions performed between two somewhat closely located devices, the service may often require network assistance/support before the service may be used, such as resource allocation for the to-be-applied service. As a result, a handover may cause problems to a ProSe capable UE (i.e. to a ProSe UE that is able to perform and actively participates in at least some of the available ProSe services).

Figure 2:
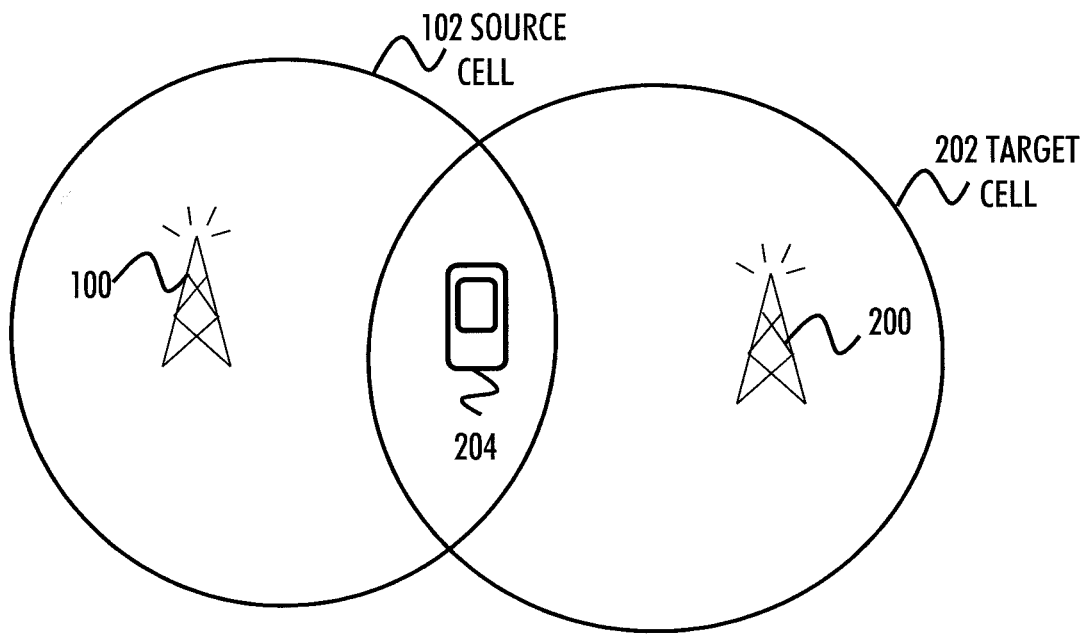

Let us look at this by referring to FIG. 2. For example, the source eNB 100 of the source cell 102 may support ProSe functionality while a target node 200 of a target cell 202 may not, or vice versa. This may be due to the target eNB 200 being, for example, a release 11 eNB, or that the ProSe operation has been disabled in the cell 202 due to the load situation, etc. In case the ProSe capable UE 204 is not aware of this, the service may suddenly end upon the handover. Moreover, even if the target eNB 200 is ProSe capable, the target eNB 200 may not transmit any ProSe specific system information block (SIB) if there are not currently any active ProSe UEs in the cell 202. In this case, the incoming UE 204 may not know whether or not the target eNB 200 is ProSe capable.

Thus, it is proposed as shown in FIG. 3, that the UE or user terminal (UT) 204 capable of performing proximity services with at least one other user terminal acquires, in step 300, an indication that a handover from the source cell 102 to the target cell 202 is to be performed. The indication may be obtained from the source node 100 or the UE 204 may make such determination itself based on radio signal measurements, for example. In step 302, the UE/UT 204 may further acquire a capability indication on whether or not the target node 200 of the target cell 202 is capable to support the proximity services. The indication may be received from the source eNB 100 before or during the handover or from the target eNB 200 after the handover. As said, supporting such ProSe services may indicate that the eNB 200 is able to allocate resources, act as a local switch between two UEs, etc. Before looking closer to the various embodiments, let us take a look at the proposal from the point of view of the source node 100 with respect to FIG. 4 and from the point of view of the target node 200 with respect to FIG. 5.

FIG. 4 shows a method according to which the source node 100 (e.g. a network node of the source cell 102) detects in step 400 that there is at least one UE 204 within the source cell 102 to be handed over to the target cell 202, wherein the at least one UE 204 is capable of performing proximity services with another user terminal. The source node 100 may then in step 402 acquire capability information on whether or not the target node 200 of the target cell 202 is capable to support the proximity services between at least two user terminals. The source node 100 may either request such information from the target node 200 or the source node 100 may receive the information without any explicit request from the target node 200. The source node 100 may then in step 404 cause a capability indication on whether or not the target node 200 is capable to support the proximity services to the at least UT 204 during the handover. The source node 100 may transmit the message to the UE(s) 204 as a dedicated message, as a broadcast, or as a multicast. The transmission of the capability indication may take place before or during the handover (HO) process, e.g. when the UE 204 is still connected to the source cell 102.

Looking from the target node's 200 point of view, as shown in FIG. 5, the proposal may comprise determining in step 500 whether or not it is capable to support proximity services between at least two user terminals located within the target cell 202. The target node 200 may be aware of such supporting function based on a firmware or software of the target eNB 200. For example, an eNB of a release 10 of the 3GPP may not be able to support the ProSe whereas an eNB of release 12 may be. The target eNB 200 may further in step 502 indicate the determination result to at least one of the following: to the source node 100 for distribution to the at least one UT 204 during the handover, directly to the at least one UT 204 after the handover. Performing the indication in the handover process may be beneficial as then the UT 204 may obtain knowledge of the capabilities of the target node 200 with respect to the ProSe even before the UT 204 is switched to the target node 200. On the other hand, informing the UT(s) 204 as a dedicated message(s), as a broadcast, or as a multicast, after the handover (i.e. when the UT 204 is connected to the target node 200) may not require any actions related to the ProSe from the source node 100.

As said different options are proposed for an eNB ProSe capability delivery to the at least one UE 204. Let us now take a close look at some embodiments with respect to FIG. 6 which depicts a handover from a ProSe capable cell to a ProSe capable or a ProSe non-capable cell. In other words, it is assumed that the source cell 102 is a ProSe capable (e.g. the node 100 is capable to support ProSe services in the cell 102) and the target cell 102 may or may not be ProSe capable.

Figure 6A:
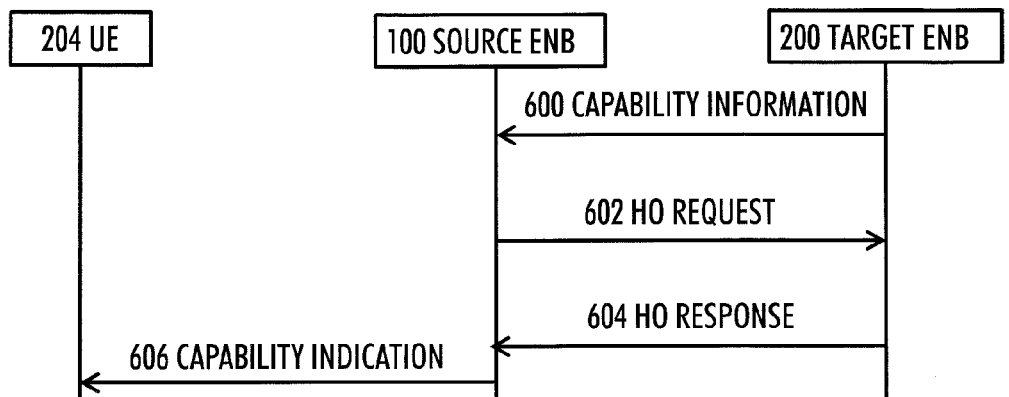
FIGS. 6A through 6D, and FIG. 7, show signal flow diagrams, according to some embodiments.

In one embodiment, as shown in FIG. 6A, a cell level ProSe capability information 600 is included in an inter-node radio resource control (RRC) message between the eNBs 100 and 200. The target eNB 200 may transmit such information to the source eNB 100 over an X2 interface, for example. Thus, the source node 100 may acquire the capability information automatically without explicitly requesting for the information. In the handover process, the source eNB 100 may then transmit the received capability information (that the target eNB 200 is or is not a ProSe capable) to the UE 204 as a capability indication 606. The UE 204 thus obtains the capability indication from the source node 100 during the handover process.

In an embodiment, the transmission of the capability indication to the at least one UE 204 from the source eNB 100 may be in an RRC connection reconfiguration message (which may also include mobility control information). The RCC connection reconfiguration message is part of the typical HO process, which is assumed to be known to a person skilled in the art. Thus, advantageously no new signaling types need to be added to the HO process. In addition, the source node 100 and the target node 200 may perform the typical HO request 602 and HO response 604 signaling between each other, as shown in FIG. 6A.

Figure 6B:
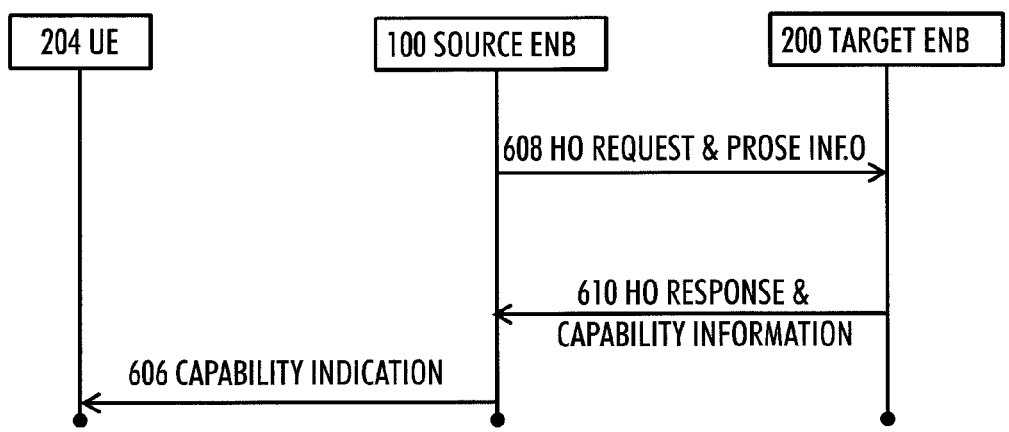

In another embodiment, as shown in FIG. 6B, the source eNB 100 may indicate to the target node that the at least one UE 204 to be handed over is capable of performing the proximity services. For this, the source eNB 100, being a ProSe supporting node, may be aware that the UE(s) 204 is a ProSe capable UE. In an embodiment, the source 100 includes such UE's 204 ProSe information (e.g. configured UE discovery context) in a modified HO request message 608 that is sent to the target eNB 200. Consequently, the target node 200 may receive from the source node 100 an indication that the incoming at least one UT 204 is capable of performing the proximity services. Thereafter, the source node 100 may receive a response message 610, such as a HO response message (i.e. a HO request acknowledge message), from the target node 200. The message 610 may include the capability information so that the source node 100 acquires the capability information from the target node 200 on the basis of the response message 610.

The response 610 may be an explicit indication on whether target eNB 200 is Prose capable or not. However, in an embodiment, the source node 100 may detect that the response message 610 does not comprise any information related to the capability of the target node 200 to support the proximity services. This may be the case for a target node 200 of older release which may not be able to interpret the additional ProSe information sent by the source eNB 100 in message 608. The lack of ProSe information in the response 610 may cause the source node 100 to determine that the target node 200 is not capable to support the proximity services.

As noted above, the target node 200 may indicate the capability information to the source node 100 autonomously (as in FIG. 6A) or on request (as in FIG. 6B) in case the HO request 608 is seen as a request to indicate also the ProSe capability. The source node 100 may then transmit or forward the capability indication 606 to the at least one UT 204. This indication may be transmitted in the RRC connection reconfiguration message, as one possibility.

Figure 6C:
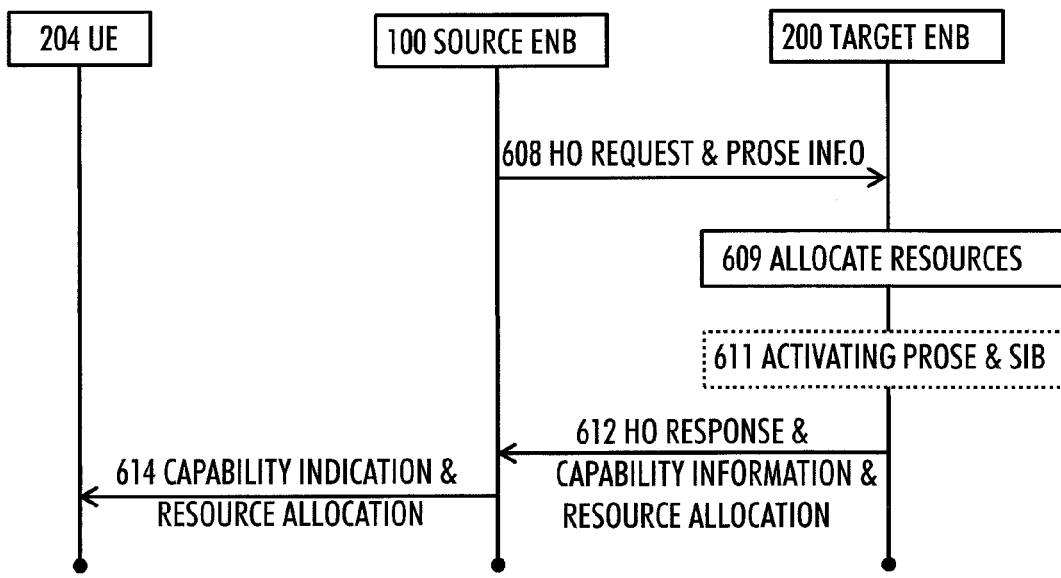

In one embodiment, as shown in FIG. 6C, the source eNB 100 may transmit ProSe related information of the UE 204 to the target node 200 in step 608 (as in FIG. 6B). However, instead of indicating only the capability information from the target node 200 to the source cell 102 as a response, the target node 200 may in step 612 indicate, e.g. a radio resource allocation with respect to a discovery process to the source eNB 100 for distribution to the at least one UE 204 during the handover. The target eNB 200 may send the allocation to the source 100 in a modified HO response 612, for example. This may be case at least when the target eNB 200 is ProSe capable and possibly has an active ProSe support. Prior to indicating the resources, the target node 200 may in step 609 first allocate radio resources for the UE discovery process to be performed by the incoming at least one UE 204 in the target cell 202. The resources may comprise, for example, resources in time domain, frequency domain, code domain, etc. The target node 200 may further in step 611 activate the ProSe support (e.g. schedule a ProSe related information to be broadcasted in the cell 202 and handle the radio resource control for the ProSe services) and start transmitting a specific system information block (SIB) message comprising the ProSe related information so that the incoming UE(s) 204 may receive the specific SIB. However, it may be that such activation and/or SIB transmission is not performed at this point yet, but at a later time.

As a result, the source eNB 100 may then transmit/broadcast/multicast the resource allocation indication, e.g., as part of the RRC connection reconfiguration message that is sent to the UE 204 in step 614. In this way, the UE 204 acquires an indication of the radio resource allocation for the user terminal discovery process to be performed in the target cell 202. This may advantageously aid in performing a fluent UE discovery after moving from one cell to another.

Figure 6D:
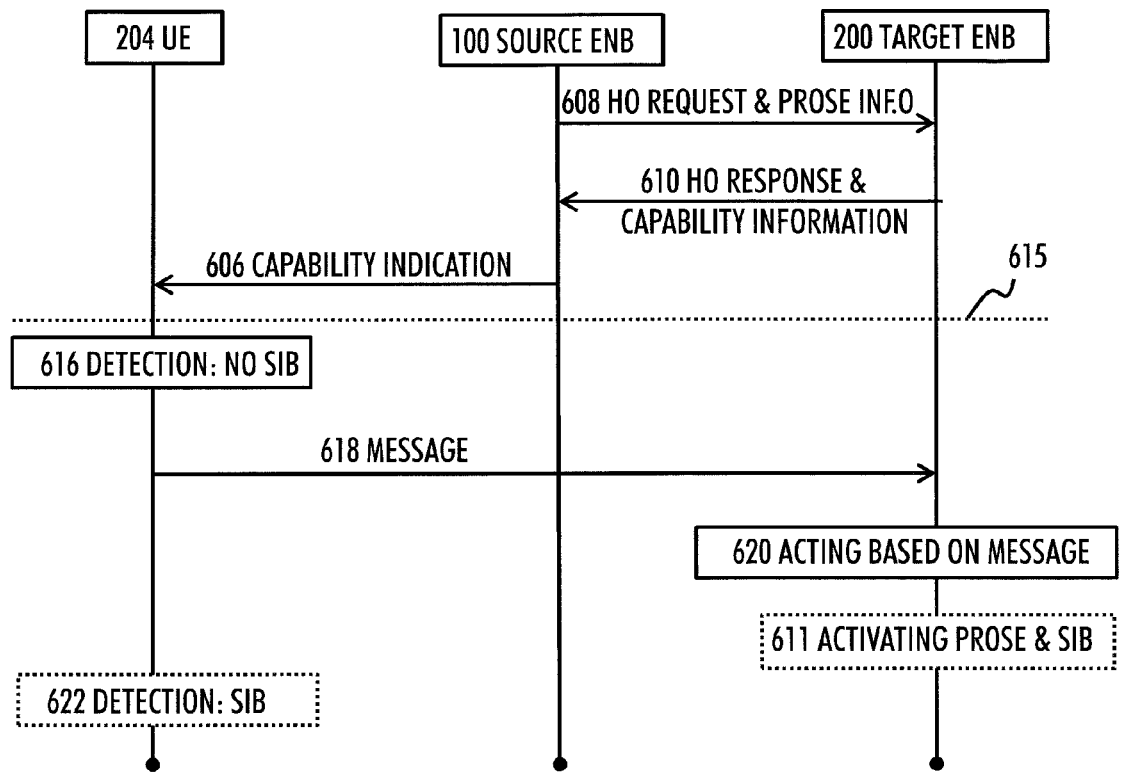

As is clear from the above, the connection reconfiguration message from the source node 100 to the at least one UE 204 during the handover may comprise in an embodiment at least one of the following: the capability indication, the indication of the allocated radio resources. This may be advantageous as no new signaling type is needed compared to the prior art handover process. The already existing message type may only be modified to carry also the capability indication and/or allocation of resources. FIG. 6D shows yet another embodiment in which the target eNB 200 may be ProSe capable and thus transmit the capability information to the source node 100 as shown in steps 608 and 610 of FIG. 6D. Consequently, the source node 100 may distribute the capability indication to the UE(s) 204, as shown with a reference numeral 606. Alternatively such capability indication could be performed as disclosed in FIG. 6A.

Once the ProSe UE is camped into the target cell 202 after the handover as shown in FIG. 6D with a dotted horizontal line having a reference numeral 615, the UE 204 may first try to detect whether or not system information related to the radio parameters for the proximity services is sent by the target node 200. This may be done by the UE 204 reading the SIB scheduling list in the SIB type1, for example. There may be a ProSe specific SIB type transmitted by the target node 200, for example. This is because it may be required that any given UE 204 always has a valid master information block (MIB), SIB type 1 and SIB type 2 stored. If the ProSe specific SIB is detected, the UE 204 may immediately notice that ProSe is supported in the target cell 202 and the UE 204 may then, for instance, read the radio resource allocation for the discovery transmission in the cell 202.

However, in FIG. 6D, even though the target node 200 may be ProSe capable, the target node 200 does not in this embodiment transmit any ProSe discovery related radio parameters to the source node 100 or to the UE 204. The ProSe discovery related radio parameters may comprise, for example, the radio resources of the UE discovery process in the target cell 202. Upon detecting in step 616 that no system information related to the radio parameters for the proximity services (such as the ProSe SIB type) is sent by the target node 200, the UE 204 may generate an RRC message 618 to the target eNB 200. It should be noted that the UE 204 may be aware of the fact that the target node 200 is ProSe capable based on message 606. However, the UE 204 may not be able to perform the services before receiving the SIB message.

Therefore, a message 618 may be sent to the target node 200. The message 618 may comprise various indications. In an embodiment, the UE 204 may cause at least one of the following: a transmission of a request message 618 to the target node 200 to activate the proximity services in the target cell 202, a transmission of an indication message 618 indicating the interest for proximity services to the target node 200. Such message 618 may also be used when the UE 204 is powered on and it camps on the LTE cell 202.

Consequently, in step 620, the target node 200 may act on the basis of the message 618. Such act may comprise, for example, activating the proximity service support, causing the transmission of the system information, as shown in block 611, and/or scheduling and generating ProSe SIB and updating SIB type 1 scheduling list. In other words, when the target node 204 becomes aware of the UE 204 in a need of performing ProSe services, the target node 204 may perform actions supporting the UE 204 in applying the ProSe services in the cell 202. Then, the UE 204 may, e.g., detect the SIB and/or radio resource allocation parameters from the target node 200 in step 622. Consequently, the UE 204 may thereafter perform the UE discovery process, for example.

In one embodiment, the source eNB 100 may indicate to the target eNB 200 that the UE 204 to be handed over is ProSe capable and ProSe active. This may be indicated in the HO request, as illustrated above. Thereafter, in an embodiment (although not shown in Figures), the source node 100 may request the target node 200 to activate the proximity service support in the target cell 202 and to transmit system information (such as the SIB) related to the radio parameters for the proximity services to the at least one UE 204. As a result, the target node 200 may activate the proximity service support and transmit the system information. In such case the UE 204, which is then handed over to the target cell 202, may immediately detect the ProSe related system information (comprising e.g. the discovery process parameters) without any additional request 618 from the UE 204.

It should be noted that the HO request 608 carrying the ProSe information of the UE(s) 204 is not necessary in FIGS. 6B, 6C, and 6D. As shown with FIG. 6A, the target node 200 may automatically transmit the information to the source node 100 in a separate message 600 or as part of the HO response 610, 612. Also, it should be noted that, alternatively, the HO request 608 may comprise a request of the ProSe capabilities of the target node 200 without any information of the ProSe capabilities of the UE 204.

Figure 7:
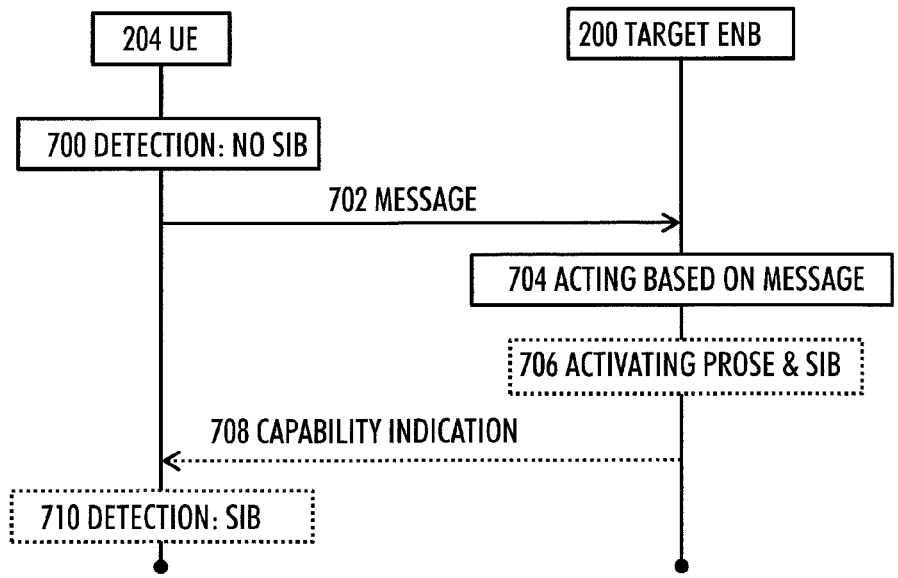

Let us then take a close look at an embodiment with respect to FIG. 7 which depicts a handover from a ProSe non-capable cell to a ProSe capable cell. In other words, it is assumed that the source cell 102 is ProSe non-capable and the target cell 102 is ProSe capable. In this case, the source node 100 may not be able to assist in indicating the ProSe capabilities of the target cell 202. E.g. the source eNB 100 may be of older versions which do not support the ProSe services or understand ProSe related messages. In such case, the capability indication may be obtained by the UE 204 from the target node 200 after the handover.

In an embodiment, the ProSe UE 204, following a successful handover to the target cell 202, may try to detect whether the ProSe specific SIB type is transmitted by reading the SIB scheduling list, for example. If there is no ProSe SIB type detected, as shown with a reference numeral 700 in FIG. 7, a message 702 may be introduced. The message may be of similar type as the message 618 in FIG. 6D. E.g. the message 702 may be at least one of the following: a request message to the target node 200 to activate the proximity services in the target cell 202, an indication message indicating the interest for proximity services to the target node 200, a query message to the target node 200 regarding the capabilities of the target node 200 with respect to the proximity services. The target node 200 may then act in step 704 based on the received message 702. The actions may comprise, e.g., activating the proximity service support and causing the transmission of the system information as shown with a block 706, indicating the ProSe capabilities to the UE 204 as shown with a reference numeral 708. Then, the UE 204 may acquire knowledge of the ProSe capability, detect the SIB and/or radio resource allocation parameters from the target node 200 in step 710, for example.

It should also be noted that in each of the above cases, the capability indication may also indicate that the target eNB 200 is not ProSe capable, e.g. it is not able to support ProSe in the cell 202. In such cases, the UE 204 need not try detecting the SIB, resources, etc.

Figure 8:
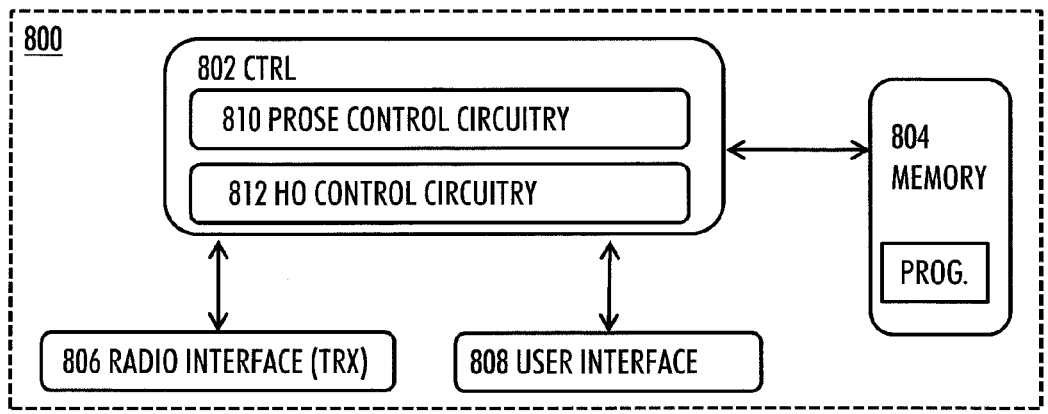
FIGS. 8 to 10 illustrate apparatuses, according to some embodiments.
Figure 9:
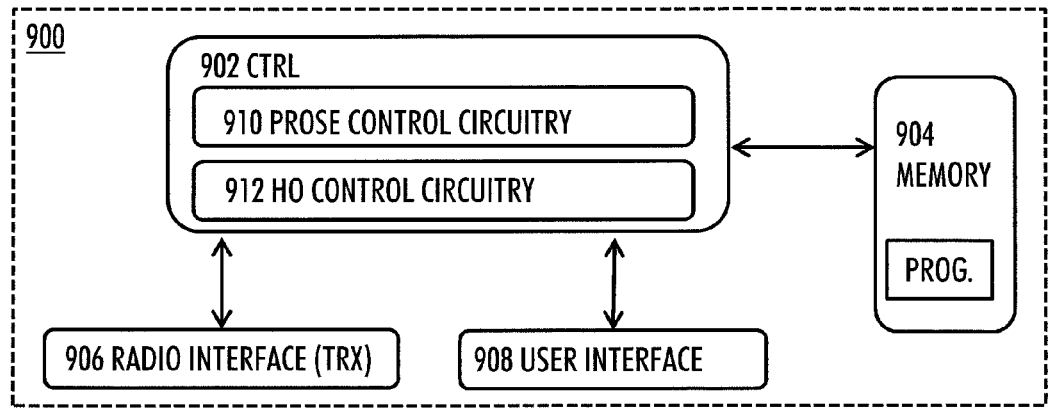
Figure 10:
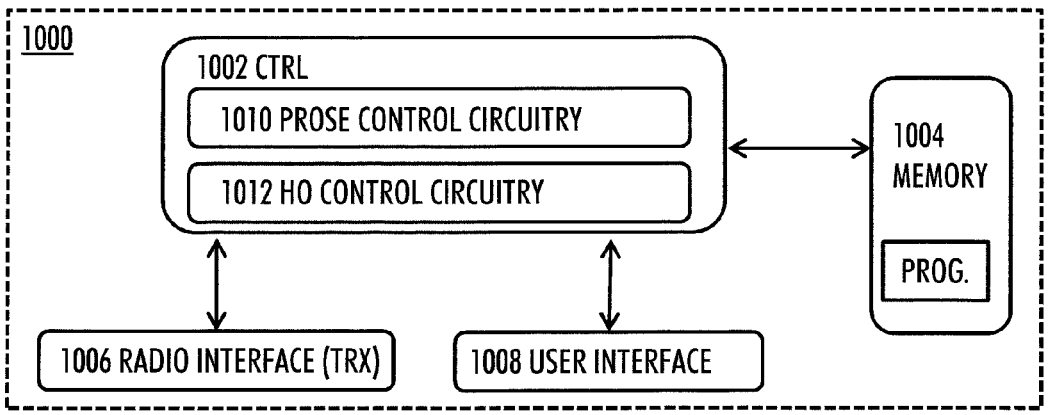

FIGS. 8 to 10 provide apparatuses 800, 900, and 1200 comprising a control circuitry (CTRL) 802, 902, 1002, such as at least one processor, and at least one memory 804, 904, 1004 including a computer program code (PROG), wherein the at least one memory and the computer program code (PROG), are configured, with the at least one processor, to cause the respective apparatus 800, 900, 1000 to carry out any one of the embodiments described. It should be noted that FIGS. 8, 9, and 10 show only the elements and functional entities required for understanding a processing systems of the apparatuses. Other components have been omitted for reasons of simplicity. It is apparent to a person skilled in the art that the apparatuses may also comprise other functions and structures.

Each of the apparatuses 800, 900, 1000 may, as said, comprise a control circuitry 802, 902, 1002, respectively, e.g. a chip, a processor, a micro controller, or a combination of such circuitries causing the respective apparatus to perform any of the embodiments of the invention. Each control circuitry may be implemented with a separate digital signal processor provided with suitable software embedded on a computer readable medium, or with a separate logic circuit, such as an application specific integrated circuit (ASIC). Each of the control circuitries may comprise an interface, such as computer port, for providing communication capabilities. The respective memory 804, 904, 1004 may store software (PROG) executable by the corresponding at least one control circuitry The apparatuses 800, 900, 1000 may further comprise radio interface components (TRX) 806, 906, 1006 providing the apparatus with radio communication capabilities with the radio access network. The radio interface components may comprise standard well-known components such as amplifier, filter, frequency-converter, (de)modulator, and encoder/decoder circuitries and one or more antennas.

The apparatuses 800, 900, 1000 may also comprise user interfaces 808, 908, 1008 comprising, for example, at least one keypad, a micro-phone, a touch display, a display, a speaker, etc. Each user interface may be used to control the respective apparatus by the user.

As said, the apparatuses 800, 900, 1000 may comprise the memories 804, 904, 1004 connected to the respective control circuitry 802, 902, 1002. However, memory may also be integrated to the respective control circuitry and, thus, no separate memory may be required. The memory may be implemented using any suitable data storage technology, such as semiconductor based memory devices, flash memory, magnetic memory devices and systems, optical memory devices and systems, fixed memory and removable memory.

In an embodiment, the apparatus 800 may comprise the terminal device of a cellular communication system, e.g. a user equipment (UE), a user terminal (UT), a computer (PC), a laptop, a tabloid computer, a cellular phone, a communicator, a smart phone, a palm computer, or any other communication apparatus. Alternatively, the apparatus 800 is comprised in such a terminal device. Further, the apparatus 800 may be or comprise a module (to be attached to the apparatus) providing connectivity, such as a plug-in unit, an "USB dongle", or any other kind of unit. The unit may be installed either inside the apparatus or attached to the apparatus with a connector or even wirelessly. In an embodiment, the apparatus 800 may be, comprise or be comprised in a user terminal capable of performing proximity services and which is to be handed over from the source cell to the target cell, such as the UE 204, for example.

The control circuitry 802 may comprise a ProSe circuitry 810 for performing the functionalities related to the proximity services, such as D2D communication, according to any of the embodiments. The ProSe circuitry 810 may also process the ProSe capability indication of the target cell. The circuitry 810 may also perform the UE discovery process on the allocated resources, for example. The control circuitry 802 may further comprise a HO control circuitry 812 for at least partly performing the functionalities related to the HO of the user terminal, such as signal measurements, causing reception of messages from the source and/or target cell, etc., according to any of the embodiments.

In an embodiment, the apparatus 900 may be or be comprised in a base station (also called a base transceiver station, a Node B, a radio network controller, or an evolved Node B, for example). In an embodiment, the apparatus 900 is or is comprised in the network node 100 of the source cell 102.

The control circuitry 902 may comprise a ProSe control circuitry 910 for performing the functionalities related to the proximity services, according to any of the embodiments. Such circuitry 910 may be present when the apparatus 900 is a ProSe supporting apparatus. The circuitry 910 may be for allocating resources for the UE discovery process, for causing the apparatus 900 to serve as the local switch, for allocating radio resources for a D2D communication, etc. The control circuitry 902 may further comprise a HO control circuitry 912 for performing functionalities related to the handover from the point of view of the source cell.

In an embodiment, the apparatus 1000 may be or be comprised in a base station (also called a base transceiver station, a Node B, a radio network controller, or an evolved Node B, for example). In an embodiment, the apparatus 1000 is or is comprised in the network node 200 of the target cell 202.

The control circuitry 1002 may comprise a ProSe control circuitry 1010 for performing the functionalities related to the proximity services, according to any of the embodiments. Such circuitry may be present when the apparatus 1000 is a ProSe supporting apparatus. The circuitry 1010 may be for allocating resources for the UE discovery process, for causing the apparatus 900 to serve as the local switch, for allocating radio resources for a D2D communication, etc. The control circuitry 1002 may further comprise a HO control circuitry 1012 for performing functionalities related to the handover from the point of view of the target cell.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

What is claimed is:

1. A method, comprising:
performing, by a user terminal, proximity services with at least one other user terminal using resources allocated by a source node of a source cell;
acquiring, by the user terminal, an indication that a handover from the source cell to a target cell is to be performed; and
acquiring a capability indication on whether or not a target node of the target cell is capable of supporting the proximity services by allocating resources of the target cell to the user terminal to perform the proximity services.

2. A method, comprising:
detecting, by a network node of a source cell with respect to a handover, that there is at least one user terminal within the source cell to be handed over to a target cell, wherein the at least one user terminal is capable of performing proximity services with another user terminal using resources allocated by the network node of the source cell;
acquiring capability information on whether or not a target node of the target cell is capable of supporting the proximity services between at least two user terminals located within the target cell by allocating resources of the target cell to the at least two user terminals to perform the proximity services; and
causing a capability indication on whether or not the target node is capable of supporting the proximity services to the at least one user terminal during the handover.

3. A method, comprising:
determining, by a network node of a target cell with respect to a handover, whether or not it is capable of supporting proximity services between at least two user terminals located within the target cell using resources allocated by the network node of the target cell; and
causing an indication of the determination result to at least one of the following:
to a source node of a source cell for distribution to the at least one user terminal which is to be handed over to the target cell during the handover, directly to the at least one user terminal after the handover.

4. An apparatus, comprising:
circuitry configured to:
perform proximity services with at least one other apparatus using resources allocated by a source node of a source cell;
acquire an indication that a handover from the source cell to a target cell is to be performed; and
acquire a capability indication on whether or not a target node of the target cell is capable of supporting the proximity services by allocating resources of the target cell to the apparatus to perform the proximity services.

5. The apparatus of claim 4, wherein the capability indication is obtained from the source node of the source cell during the handover.

6. The apparatus of claim 4, wherein the the circuitry is configured to:
acquire an indication of a radio resource allocation for a user terminal discovery process to be performed in the target cell.

7. The apparatus of claim 4, wherein a connection reconfiguration message from the source node during the handover comprises at least one of the following: the capability indication, the indication of the allocated radio resources.

8. The apparatus of claim 4, wherein the circuitry is configured to:
detect whether or not system information related to radio parameters for the proximity services is sent by the target node; and
upon detecting that no system information related to the radio parameters for the proximity services is sent by the target node, cause at least one of the following:
a transmission of a request message to the target node to activate the proximity services in the target cell, a transmission of an indication message indicating interest for proximity services to the target node, a transmission of a query message to the target node regarding the capabilities of the target node with respect to the proximity services.

9. The apparatus of claim 4, wherein the capability indication is obtained from the target node after the handover.

10. The apparatus of claim 4, wherein the apparatus is a user equipment operating according to the long term evolution or according to the long term evolution advanced and/or is a mobile terminal.

11. An apparatus, comprising:
circuitry configured to:
detect that there is at least one user terminal within a source cell to be handed over to a target cell, wherein the at least one user terminal is capable of performing proximity services with another user terminal using resources allocated by the apparatus of the source cell;
acquire capability information on whether or not a target node of the target cell is capable of supporting the proximity services between at least two user terminals located within the target cell by allocating resources of the target cell to the at least two user terminals to perform the proximity services; and
cause a capability indication on whether or not the target node is capable of supporting the proximity services to the at least user terminal during the handover.

12. The apparatus of claim 11, wherein the circuitry is configured to:
indicate to the target node that the at least one user terminal to be handed over is capable of performing the proximity services;
receive a response message from the target cell; and
acquire the capability information from the target node on the basis of a response message.

13. The apparatus of claim 12, wherein the circuitry is configured to:
detect that the response message does not comprise any information related to the capability of the target node to support the proximity services; and
determine that the target node is not capable to support the proximity services on the basis of the detection, thereby acquiring the capability information.

14. The apparatus of claim 11, wherein the circuitry is configured to:
receive, from the target node, an indication of radio resource allocation for a user terminal discovery process to be performed by the at least one user terminal in the target cell; and
indicate the allocated radio resources to the at least user terminal.

15. The apparatus of claim 11, wherein the circuitry is configured to:
request the target node to activate the proximity service support in the target cell and/or to transmit system information related to radio parameters for the proximity services to the at least one user terminal.

16. The apparatus of claim 11, wherein the apparatus is a base station operating according to the long term evolution or according to the long term evolution advanced.

17. An apparatus, comprising:
circuitry configured to:
determine whether or not a network node of a target cell with respect to a handover is capable of supporting proximity services between at least two user terminals located within the target cell using resources allocated by the network node of the target cell; and
cause an indication of the determination result to at least one of the following:
to a source node of a source cell for distribution to the at least one user terminal which is to be handed over to the target cell during the handover, directly to the at least one user terminal after the handover.

18. The apparatus of claim 17, wherein the circuitry is configured to:
cause the indication of the determination result on request or autonomously.

19. The apparatus of claim 17, wherein the circuitry is configured to:
cause a reception of an indication that the incoming at least one user terminal is capable of performing the proximity services from the source node.

20. The apparatus of claim 17, wherein the circuitry is configured to:
allocate radio resources for a user terminal discovery process to be performed by the incoming at least one user terminal in the target cell; and
indicate the allocated radio resources to the source node for distribution to the at least one user terminal during the handover.

21. The apparatus of claim 17, wherein the circuitry is configured to:
cause a reception of a request from the source node to activate the proximity service support in the target cell and/or to transmit system information related to the radio parameters for the proximity services to the at least one user terminal; and
activate the proximity service support and/or cause the transmission of the system information.

22. The apparatus of claim 17, wherein the circuitry is configured to: processor, cause the apparatus to:
    cause a reception of at least one of the following: a request message from the at least one user terminal to activate the proximity services in the target cell, an indication message indicating interest for proximity services from the at least one user terminal, a query message from the at least one user terminal regarding the capabilities of the apparatus with respect to the proximity services.

23. The apparatus of claim 17, wherein the apparatus is a base station operating according to the long term evolution or according to the long term evolution advanced.

* * * * *